(12) United States Patent
Nishida

(10) Patent No.: US 6,810,403 B2
(45) Date of Patent: Oct. 26, 2004

(54) VISUAL DATABASE SYSTEM FOR STORING DATA WITH TIME CODES

(75) Inventor: Shinsuke Nishida, Tokyo (JP)

(73) Assignee: Fourie, Inc., Tokyo (JP)

(*) Notice: Subject to any disclaimer, the term of this patent is extended or adjusted under 35 U.S.C. 154(b) by 0 days.

(21) Appl. No.: 10/281,214

(22) Filed: Oct. 28, 2002

(65) Prior Publication Data

US 2003/0063114 A1 Apr. 3, 2003

Related U.S. Application Data

(62) Division of application No. 09/564,798, filed on May 5, 2000, now Pat. No. 6,502,107.

(30) Foreign Application Priority Data

May 13, 1999 (JP) .......................................... 11-133250

(51) Int. Cl.[7] .............................................. G06F 17/30
(52) U.S. Cl. .................................................. 707/104.1
(58) Field of Search ...................... 707/104.1; 345/473, 345/474, 475; 386/47, 98

(56) References Cited

U.S. PATENT DOCUMENTS

| | | | |
|---|---|---|---|
| 5,379,380 A | | 1/1995 | Mori et al. |
| 5,440,401 A | | 8/1995 | Parulski et al. |
| 5,485,611 A | | 1/1996 | Astle |
| 5,559,936 A | * | 9/1996 | Poulter et al. ............... 345/428 |
| 5,583,979 A | * | 12/1996 | Sonohara et al. ............ 345/473 |
| 5,673,380 A | * | 9/1997 | Suzuki ........................ 345/473 |
| 5,737,532 A | | 4/1998 | DeLair et al. |
| 5,802,239 A | * | 9/1998 | Fujinami ..................... 386/47 |
| 5,937,136 A | * | 8/1999 | Sato ............................. 386/52 |
| 6,298,194 B1 | * | 10/2001 | Takahashi .................... 386/46 |
| 6,332,146 B1 | | 12/2001 | Jebens et al. |
| 6,339,657 B1 | | 1/2002 | Yamaguchi et al. |
| 6,502,107 B1 | * | 12/2002 | Nishida .................... 707/104.1 |

OTHER PUBLICATIONS

Abe, Keiko, Image Display Apparatus and Method, US patent application Publication No. US 2002/0105593 A1, Aug. 8, 2002.*

* cited by examiner

Primary Examiner—Greta Robinson
Assistant Examiner—Debbie M. Le
(74) Attorney, Agent, or Firm—Sughrue Mion, PLLC

(57) ABSTRACT

The visual database system comprises at least one visual data input device for inputting visual data, a visual database system device for storing the visual data, and at least one visual data output device for receiving the visual data from the visual database system device at a predetermined resolution, and displaying and printing the visual data and the visual database system device obtains a divided state by dividing the input visual data into multiple block screens, expresses the visual data as addresses and image data represented by addresses, saves these, and creates and transmits visual data for output in accordance with a resolution requested by the visual data output device.

6 Claims, 4 Drawing Sheets

FIG.3A
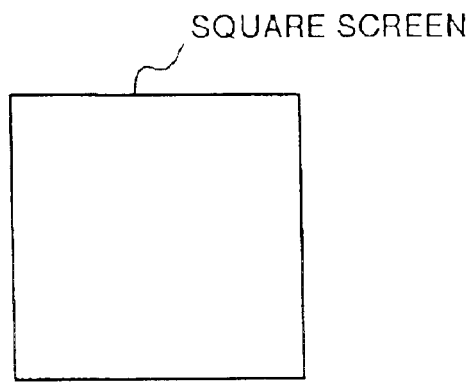
FIG.3B
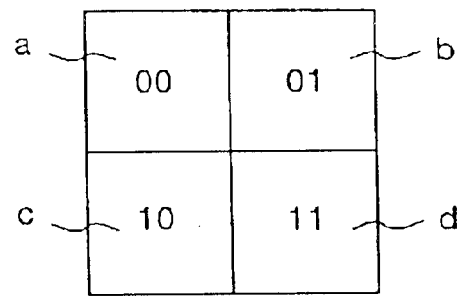
FIG.3C
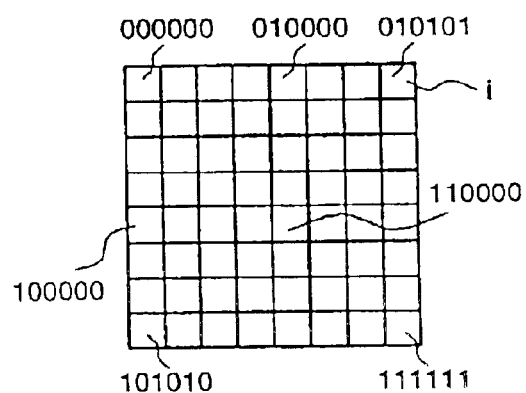
FIG.3D

VISUAL DATABASE SYSTEM FOR STORING DATA WITH TIME CODES

This is a Divisional of Application No. 09/564,798 filed May 5, 2000, now U.S. Pat. No. 6,502,107, the disclosure of which is incorporated herein by reference.

FIELD OF THE INVENTION

The present invention relates to a visual database system for storing and transmitting image data such as, at least, moving images and still images. More particularly, this invention relates to the visual database system which can provide visual data to a visual data output device capable of outputting visual data in the manner of a display device and a printer, such that the visual data has a resolution appropriate to the resolution of the visual data output device and to the intended use of the visual data.

BACKGROUND OF THE INVENTION

In recent years, due to the development of a variety of visual devices and advances in visual processing technology, visual data having various resolutions are being created and used to produce still images, moving images, and sound. Furthermore, following the development of image processing technology and communications networks, visual data is playing an important role in the world of computers.

Various methods are used to create this type of visual data, such as filming it using a visual input device such as a camera, scanning an image with a scanner, creating visual data using computer graphics (CG), and the like.

To output (display and print) visual data, display methods such as a CRT, a liquid crystal display, a plasma display, visual display devices such as an image projector, and print methods such as printing visual data as a still image using an image printing device such as a printer and a copying machine, are used.

Methods for transmitting visual data in a state that can be reproduced (output) include storing the visual data in a memory medium such as a video tape, a memory, a CD, and a DVD, transmitting the visual data via a wired network such as cable television and the internet, and the like, or transmitting the visual data via a non-wired broadcasting such as television broadcasting.

A visual database system is formed for accumulating and transmitting visual data of this kind. For example, the closest examples of a conventional visual database system are a broadcast system for transmitting visual data from a broadcast station by television broadcasting, a communications karaoke system for transmitting visual data in accordance with a request from a user, a video-on-demand system for similarly transmitting movies (visual data) in accordance with requests from users, and an internet retrieve system for downloading visual data via a network.

However, in the conventional visual database systems described above, the visual data is generally stored in one type of resolution when it is created. In addition, when transmitting the visual data, visual data of only one type of resolution (the same resolution) is transmitted. Therefore, such conventional systems have the following two problems.

(1) Since devices for outputting the transmitted visual data have different resolutions when displaying and printing, there is a problem that the performance of each device cannot between used to sufficient advantage when handling visual data of a single resolution. For example, visual data displayed in large scale has relatively poor resolution, losing the benefits of the characteristics of a large-scale display.

(2) The resolution required differs according to the use for which the visual data is intended, but when the visual data has a single resolution, the resolution may not be the appropriate one, and may be too low or too high for the intended use. For example, when the visual data is displayed as a still image, it should ideally have the maximum resolution of the display device, but when the visual data is displayed as a moving image, it is not essential for the resolution to be high, given the nature of human visual perception.

Conventionally, when creating a database system, the intended use of the visual data and the output device are assumed in advance, and the visual data is stored and transmitted at the most frequent resolution to achieve most appropriate results, but there has not been a visual database system having high usability for storing and transmitting visual data at resolution appropriate for the various intended uses requested by the user and appropriate for the output device.

In a conventional visual database system, it is possible to solve the above problems (1) and (2) simply by storing multiple visual data in multiple resolutions for each visual data. However, in this case, since the visual data to be transmitted must be selected from among the stored resolutions, it may not be possible to transmit visual data at an appropriate resolution. In particular, when the visual data is enlarged prior to output, the resolution of the visual data deteriorates as a result of this enlargement, whereby it is impossible to transmit the visual data with a resolution appropriate to the resolution of the device which outputs the visual data.

Moreover, in the conventional art, no method has been provided for effectively storing visual data formatted so that the amount of data changes with the amount of change of the image in a memory medium wherein the memory position changes over time.

Therefore, for example, when storing visual data formatted so that the amount of data changes with the amount of change of the image in a memory medium wherein the memory position changes over time, in a case where the visual data are merely stored, the memory position changes over time irrespective of the quantity of visual data and whether or not data is present, thereby consuming the memory regions of the memory medium. Consequently, the memory regions of the memory medium are consumed without being used, making it impossible to store the visual data efficiently. When reproducing visual data stored in a memory medium wherein the memory position changes over time, since the elapse of time is stored as a change of the memory position, the visual data must basically be read out from the memory medium at a constant speed.

SUMMARY OF THE INVENTION

It is an object of this invention to provide a visual database system capable of transmitting visual data at a resolution appropriate to the resolution of a device for outputting the visual data, and also capable of transmitting visual data at a resolution appropriate to the use for which the visual data is intended.

It is another object of this invention to provide a visual database system capable of transmitting visual data always having a resolution appropriate to the resolution of the device for outputting the visual data by creating visual data at different resolutions as required from a single visual data prior to transmission.

It is yet another object of this invention to provide a visual database system capable of storing visual data formatted so that the amount of data changes with the amount of change of the image in a memory medium wherein the stored position changes over time, and efficiently reproducing the visual data by reading it out from the memory medium when required.

In order to achieve the above objects, according to one aspect of this invention, a visual database system for storing and transmitting visual data such as at least moving images and still images, comprising at least one visual data input device which visual data are input to; a visual database device which stores the visual data from the visual data input device; at least one visual data output device which receives the visual data at a predetermined resolution from the visual database device, and displays and prints the visual data. The visual database device receives the visual data from the visual data input device, divides the input visual data into multiple block screens, appends a first address to each of the division block screens, further divides the block screens identified by the first addresses, appends a second address to each of the division block screens, and thereafter repeats the dividing and appending of addresses for a predetermined number of times. The visual data are expressed and stored as addresses and image data of a divided image represented by the addresses, and visual data for output are created in accordance with a resolution of the visual data output device, and transmitted.

According to another aspect of this invention, a visual database system for storing and transmitting visual data such as at least moving images and still images comprises at least one visual data input device which visual data are input to; a visual database device which stores the visual data from the visual data input device; and at least one visual data output device which receives the visual data at a predetermined resolution from the visual database device, and displays and prints the visual data. The visual database device receives the visual data from the visual data input device, divides the input visual data into multiple block screens, appends a first address to each of the division block screens, then further divides the block screens identified by the first addresses, appends a second address to each of the division block screens, and thereafter repeats the dividing and appending of addresses for a predetermined number of times. The visual data are expressed and stored using addresses and image data of a divided image represented by the addresses, and time codes representing a temporal position in changes over time. Visual data for output are created and transmitted in accordance with an output resolution of a still image and a moving image of the visual data output device.

Further, before receiving visual data from the visual database device, the visual data output device notifies the visual database device of information specifying the visual data it wishes to receive, its own resolution or a desired resolution, and output time units for receiving a moving image in slow motion or fast forward or the like.

Further, the addresses are defined with a divided state represented by division levels n, the division state is defined so as to obtain the 2nth power of 2 pieces of block division images by dividing the vertical and horizontal axes of the display screen by the nth power of 2, respectively, and the addresses are specified using the division levels n.

Further, the addresses are defined by appending first addresses of two bits "00", "01", "10", and "11" to four division blocks obtained by a division state represented by division level n=1, second addresses of two bits "00", "01", "10", and "11" are appended to blocks obtained by further dividing into four the one-quarter division blocks identified by the first addresses. This division is repeated while appending the first addresses followed by the second addresses.

Further, when the visual data output to the visual data output device comprises a still image, the visual database device creates and transmits visual data for output at the maximum resolution of the visual data output device. When the visual data comprises a moving image, the visual database device creates and transmits visual data for output having a resolution altered in accordance with the speed of the movement of moving image.

Further, when creating visual data for output from stored visual data and transmits the visual data for output, the visual database device changes a database usage fee for the visual data in accordance with the resolution of the visual data for output.

Further, the visual database device uses the addresses to express a visual object, and stores visual data only for this visual object.

According to still another aspect of this invention, in a visual database system for storing visual data, comprising a visual format in which the amount of data changes according to the amount of change of an image, in a memory medium wherein a memory position changes over time, and reading the visual data from the memory medium as required, time codes are appended to one or multiple visual data when stored in the memory medium. When the visual data is reproduced from the memory medium, the time codes are read while extracting the visual data from its memory position, and the reproduction speed of the memory medium is changed so that the visual data is reproduced in correspondence with changes over actual time.

Other objects and features of this invention will become apparent from the following description with reference to the accompanying drawings.

BRIEF DESCRIPTION OF THE DRAWINGS

FIG. 3A to FIG. 3D are diagrams showing a process of creating address data according to the embodiment.

DESCRIPTION OF THE PREFERRED EMBODIMENTS

Figure 1:
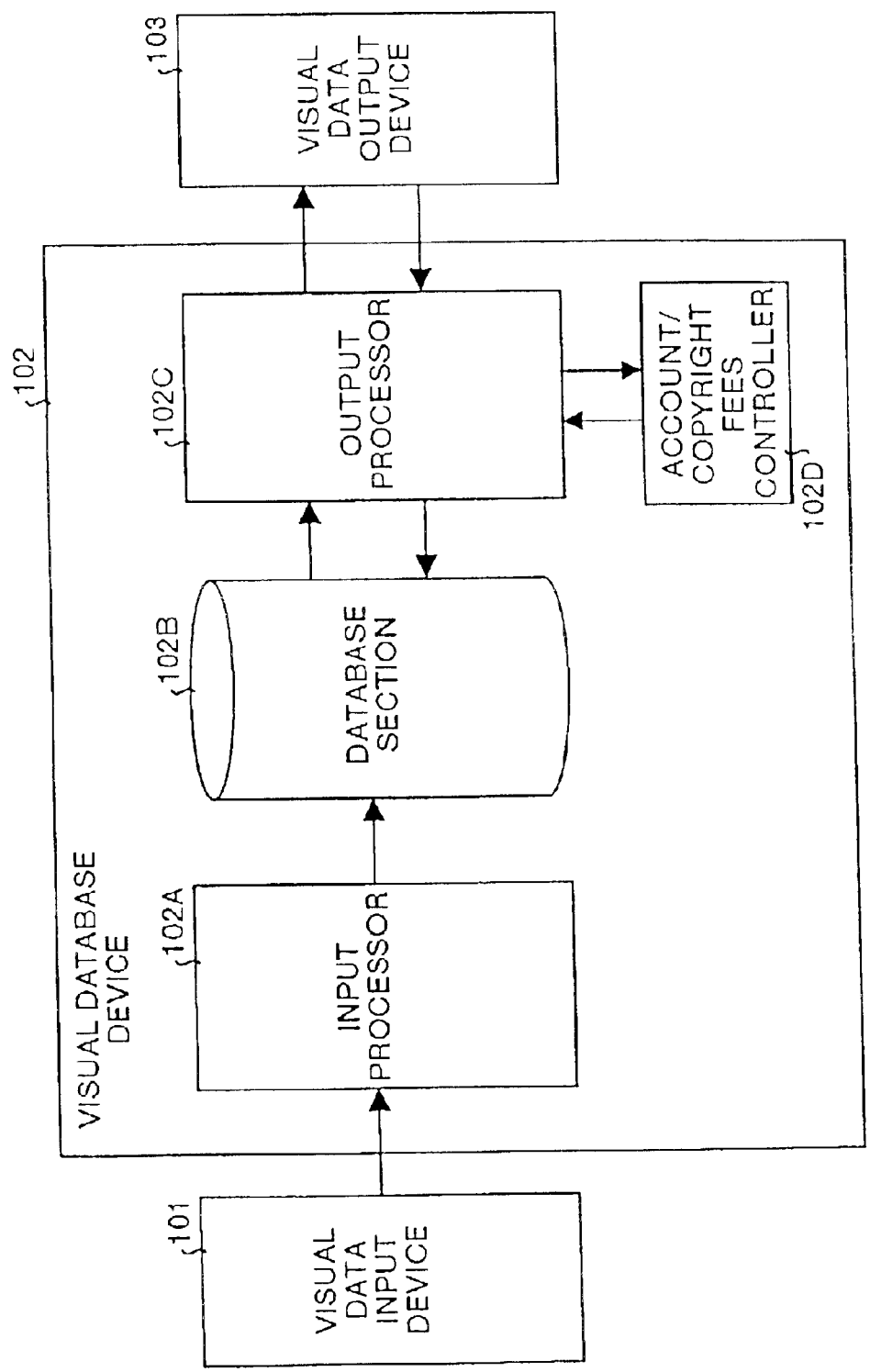
FIG. 1 is a diagram showing a constitution of an embodiment of a visual database system.

With regard to a preferred embodiment of the visual database system of the present invention, the following will be explained sequentially in detail with reference to the accompanying drawings:

1. A constitution of the visual database system
2. Inputting visual data
   2-1 creating an address
   2-2 storing visual data
3. Outputting visual data
4. Creating accounts and copyright fees
5. Advantages of the preferred embodiment of the visual database system

1. A constitution of the Visual Database System

Figure 2:
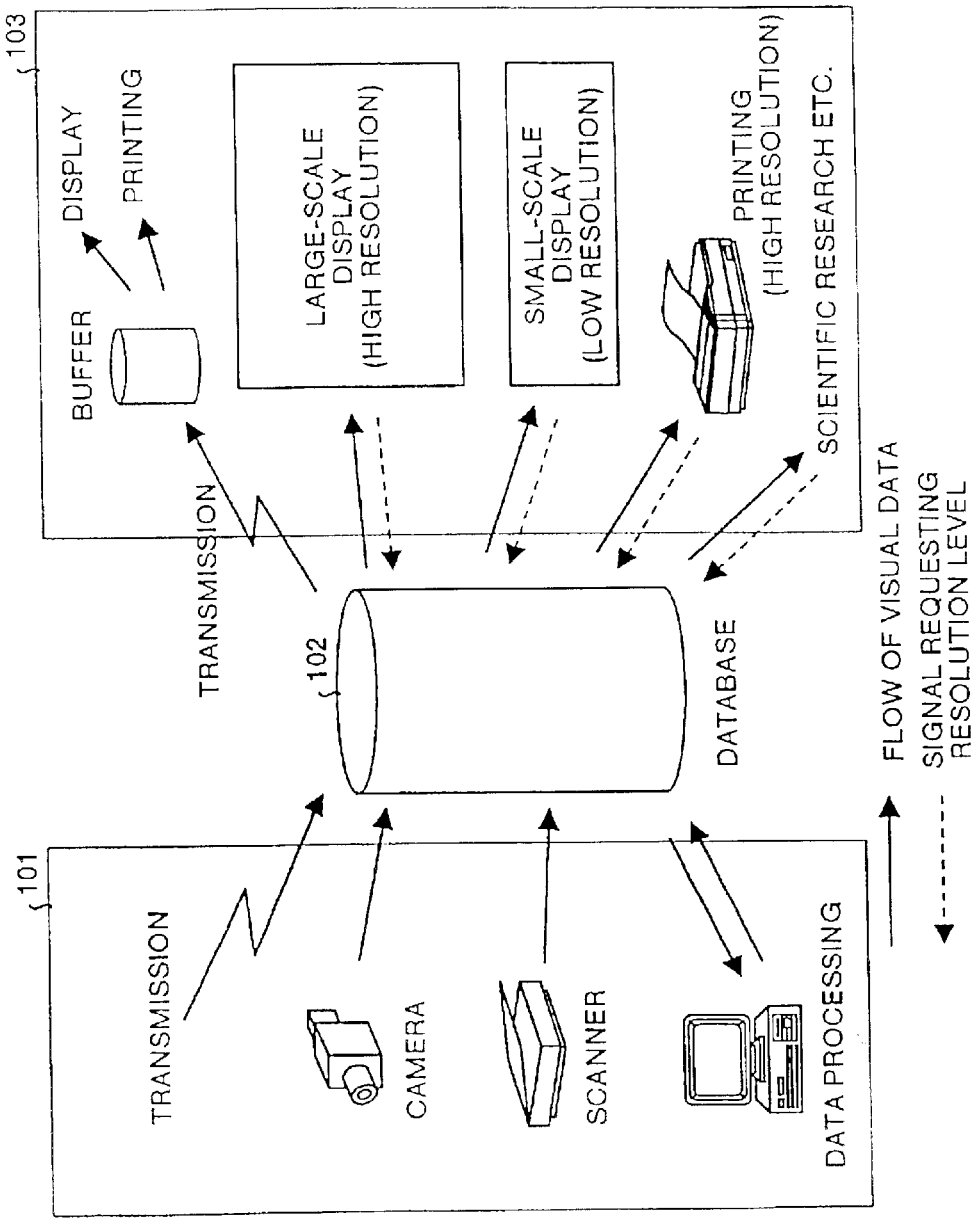
FIG. 2 is a diagram schematically showing an embodiment of the visual database system.

FIG. 1 shows a constitution of the visual database system according to a preferred embodiment, and FIG. 2 shows a diagrammatic view of the visual database system according to the preferred embodiment. As shown in FIG. 1, the visual database system according to the preferred embodiment comprises at least one visual data input device 101 for inputting visual data, a visual database device 102 for storing and transmitting the visual data input from the visual data input device 101, and at least one visual data output device 103 which receives the visual data from the visual database device 102 at a predetermined resolution, and displays and prints the visual data.

There are no particular restrictions on the type of device used for the visual data input device 101, provided that it has a function for inputting the visual data to be stored in the visual database device 102. More specifically, as shown diagrammatically in FIG. 2, the visual data may be created using a camera such as a video camera or a digital still camera, a scanner and the like for capturing an image, or a computer and the like. Furthermore, a data processor may be provided for processing the visual data input from the visual database device 102.

In the visual database system of this invention, only at least one visual data input device 101 need be provided. However, considering the possibility that the use of the system and the system itself will be expanded to a large scale, it is natural that multiple visual data input devices 101 of different types are provided. The visual database device 102 may extract the visual data from the visual data input device 101 by a direct connection between the visual data input device 101 to the visual database device 102, or via a wired or non-wired communications circuit.

There are no particular restrictions on the type of device used as the visual data output device 103, provided that it has a function for displaying and printing visual data input thereto. More specifically, as shown diagrammatically in FIG. 2, a large-scale display device, a miniaturized display device, any type of device having a display device, a printing device such as a printer, a copier, a fax machine, and the like, can be used. Of course, the resolutions of these devices range from high to low.

When the visual data output device 103 is directly connected to the visual database device 102, another database or a memory medium may be provided as a buffer therebetween, as shown in FIG. 2. In addition, when the visual data input from the visual database device 102 is not directly displayed or printed, but is instead computed and analyzed as processed information, it is assumed that the visual data output device 103 of this invention functions as the processor and output device, and this type of usage is of course within the sphere of use of the visual database system.

However, these visual data output devices 103 have a communications function for sending and receiving information comprising a requested resolution to and from the visual database device 102, and when receiving visual data from the visual database device 102, the visual data output devices 103 notify the visual database device 102 in advance by sending information specifying the visual data they wish to receive, their own resolution, and the resolution they desire. This constitution can be easily realized using a conventional a communications device, and will not be explained in detail here.

In the visual database system of this invention, at least one visual data output device 103 should be provided. However, in view of the likelihood that the system will be used on a large scale and expanded accordingly, it is natural that there will be multiple visual data output devices 103 of different types. When capturing visual data from the visual database device 102, the visual data output device 103 may receive the visual data by a direct connection to the visual database device 102, or via a wired or non-wired communications cable.

As shown in FIG. 1, the visual database device 102 comprises an input processor.102A for receiving visual data input from the visual data input device 101, and appending thereto address data showing the position of the visual data on a screen, and a time code showing the temporal position during temporal changes of the visual data, a database section 102B for storing the display data to which the input processor 102A has appended address data and time codes, an output processor 102C for using the display data, the address data, and the time codes stored in the database section 102B to create visual data for output in accordance with the resolutions requested by the visual data output device 103, and transmitting this visual data for output, an account/copyright fees controller 102D for creating account information and copyright fees for the copyright holder in accordance with the resolution of the visual data for output created by the output processor 102C. Of course, this account/copyright fees controller 102D need not be provided in a database which does not produce accounts and the like. A server provided on a network can, for example, be used as the visual database device 102. The visual database device 102 can comprise multiple servers.

2. Inputting Visual Data

A process of inputting visual data by the input processor 102A of the visual database device 102 will be next explained in detail. As mentioned above, the input processor 102A receives the visual data from the visual data input device 101, and appends address data showing positions of the visual data on a screen, and time codes showing positions of the visual data during changes in time to the display data constituting the input visual data.

2-1. Creating Address Data

Appending an address (creating address data), which is one of the processes of inputting the visual data, will be explained here with reference to FIG. 3. When the visual data input device 101 inputs the visual data to the input processor 102A of this embodiment, the input processor 102A converts the input visual data to digital visual data using addresses. The resolution of the visual data input device 101 varies according to the type of input device used, such as a camera or a scanner, and utilizes a variety of different systems for inputting moving images by a scanning line, such as aspect ratio and number of scanning lines, in addition to interlacing and no-interlacing methods. Accordingly, the input processor 102A converts the input visual data to a visual format which is not dependent on the hardware of the input device.

Firstly, the square screen shown in FIG. 3A is prepared. The top of the left side of this square screen is the starting point, and the top of the left side of the input visual data is aligned to this starting point. Many input screens are rectangular and have various aspect ratios, but when the top of the left side is deemed to be the focal point no matter what the shape of the image, it is possible to realize the image on this square screen.

The screen of FIG. 3A is divided into four sections, blocks a to d are set as division level 1, and addresses "00", "01", "10", and "11" are appended in the blocks from top left to down right as shown in FIG. 3B. Then, the blocks are further divided into a division level 2, with similar addresses being appended. That is, the block a with the address "00" in FIG. 3B is divided as shown in FIG. 3C, forming blocks e, f, g, and h, having the addresses "0000", "0001", "0010", and "0011" respectively.

In FIG. 3D, the blocks of FIG. 3C are divided yet again to form a division level 3, whereby, for example, the address i at the top right side becomes "010101". For a division level n, the vertical axis of the screen is divided into the nth power of 2, obtaining a number of blocks which is the 2nth power of 2, and the addresses of the blocks are displayed at a width of 2n bits. When n=0, this represents the state shown in FIG. 3A, in which there are no divisions. Of course, the divisions and appended addresses do not necessarily have to be provided in the manner shown here in order to realize the present invention.

The input processor 102A checks the input visual data, and creates image data with addresses appended thereto by the method described above. Many regions of the image data contain identical data. For example, when a unicolor background is displayed, a large area of the screen comprises data representing the same color.

Accordingly, the input processor 102A checks the proportion of the entire screen occupied by identical data, and appends divided addresses thereto. In fact, for addresses following further divisions, the image data is formed by checking until a division level is reached where only identical data is present, and determining addresses for these data. In an extreme case where the entire screen comprises identical data, only one data with no specified address is provided. In such a case, the data can be displayed at level 0, where there is no division, and without addresses. Conversely, extremely detailed visual data is expressed by a high division level, and the division addresses use a long bit width. Thus the input visual data is converted to visual data comprising collections of primary images represented by data to which addresses of each level have been appended.

A characteristic of this method is that the input visual data can be expressed as digital data no matter how high its resolution. The resulting format is not dependent on the resolution of hardware on the input side.

2-2. Storing Visual Data

The input processor 102A converts the input visual data to digital visual data using addresses, but here time codes relating to input of moving images will be explained. Input image data for a moving image, the above-mentioned addresses are set for each image factor comprising a group of identical data forming the moving image on the screen, and time codes are appended simultaneously. The time codes can be set by various methods. Here, a method in which the time from the creation of the image factors to their termination is recorded will be explained. By way of example, when the visual data represents a white cloud against a blue sky as shown in FIG. 4A, the image of the cloud remains the screen until the camera is turned away from the cloud to another object, or until the cloud itself moves out of the screen.

The image of the cloud comprises multiple groups of image factors having the addresses described above. A time code is appended to each image factor. For example, when the image factors are generated from the 9000.000th second after the start of the moving image, and last for a period of 2.112 seconds, this is represented by a time code of [9000.000+2.112] or the like. The time codes here are shown to one thousand of a second, but this varies according to the constitution of the hardware of the input device. For example, when a twenty-four frame film, used for a movie or the like, is converted to digital data, the minimum resolution will be $\frac{1}{24}$ second. Since television cameras have sixty or fifty fields per second, and the like, multiples of these values form hangover time.

Figure 4A:
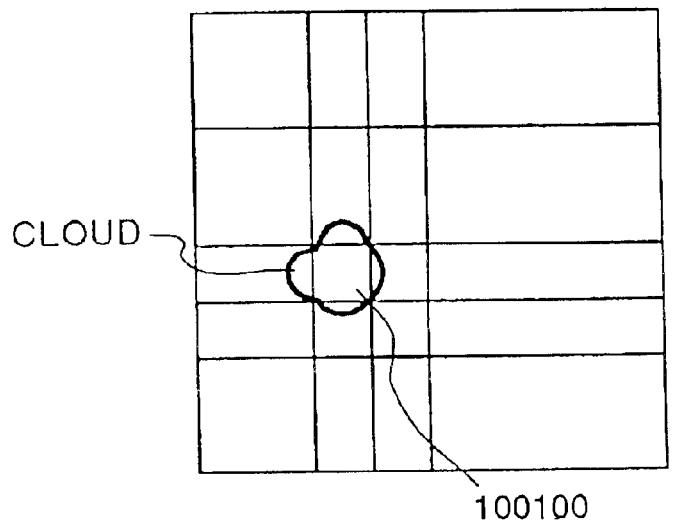
FIG. 4A and FIG. 4B are diagrams showing a method for recording time from the generation of an image factor until its termination in a process of storing visual data according to the embodiment.
Figure 4B:
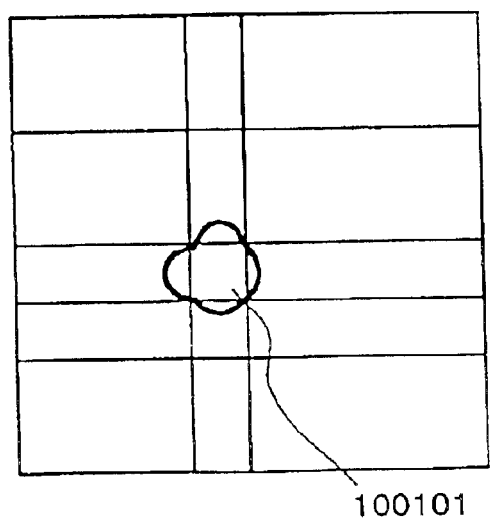

The largest visual factor of the cloud is at the address "100100: white data" shown in FIG. 4A, and as the cloud moves, the visual factor shifts to the address "100101: white data" shown in FIG. 4B. Since the visual factor has shifted in accordance with the movement of the cloud, the following sequence observed: the image factor is displayed, then disappears, and the next image factor is displayed. When time codes are appended, the image factor of FIG. 4A is shown as "100100: white data: 9000.000+2.500". The image factor of FIG. 4B is "100101: white data: 9002.500+3.000". This shows that the image factor of FIG. 4A is displayed for 2.5 seconds following the 9000th second after the image starts moving, then disappears, and the next image factor of FIG. 4B is displayed for three seconds from the 9002.5th second. To an observer, the cloud appears to be moving. This example describes a single image factor, but in fact, addresses, display data, and time codes are appended to all the image factors forming the cloud.

In the method described above, the input visual data is divided into image factors, and addresses, display data representing colors, and time codes are appended thereto, thereby facilitating storage in the database section 102B. By this method, there is no need to prepare a video tape or the like having the same length as the time of the moving image, and since this invention is able to express everything using this type of digital data, the data need only be stored in a memory medium without gaps therein. According to the method described above, since the amount of data is equivalent to the number of visual factors, when the display contents have few visual factors, that is, a small amount of display contents having a low resolution, data for a moving image lasting a long time can be stored in the database section 102B using a small memory capacity.

Furthermore, when the contents of the database section 102B are stored in an external recorder and the like, since time codes are appended in this invention, the data of the image factors need only be stored without gaps therebetween. This enables the visual data to be efficiently stored at high density without wasting the memory capacity.

3. Outputting the Visual Data

A process of outputting visual data in the output processor 102C of FIG. 1 will next be explained. The output processor 102C uses the visual data (addresses, display data, and time codes of the image factors) stored in the database section 102B to create and transmit visual data for output in accordance with the output resolution and reproduction speed requested by the visual data output device 103.

Firstly, a case will be explained in which the visual data output device 103 requests visual data for a still image. The output processor 102C creates visual data having the resolution requested by the visual data output device 103 from the visual data stored in the database section 102B. When the resolution requested by the visual data output device 103 is higher than the resolution of the visual data stored in the database section 102B, the output processor 102C need only output the still image of the visual data stored in the database section 102B. Conversely, when the resolution requested by the visual data output device 103 is lower than the resolution of the visual data stored in the database section 102B, the output processor 102C lowers the resolution, and outputs at the requested resolution.

As explained in the process of creating address data of 2.1, when visual data is stored according to its division level and address, the resolution rises to a quarter-resolution as the division level proceeds. Accordingly, to lower the resolution, an average or the like of the four divided visual data is calculated, and visual data having few division levels is created. In the example shown in FIGS. 3A to 3D, the addresses of FIG. 3D are obtained by further dividing into four those of FIG. 3C and appending "00", "01", "10", and "11" to those addresses. Therefore, display data at the level of FIG. 3C can be created by calculating the average value of these four display data of FIG. 3D.

The above explanation describes a calculated average, but in fact an average is used which takes into consideration the characteristics of human visual perception of colors and brightness. However, it is difficult to faithfully display a calculated average value on the display side since most display devices generally control the display elements by switching them ON and OFF. For this reason, the output processor 102C can easily change the resolution.

The method described above can also be used when changing the resolution used to display images in an enlarged or miniaturized format. When intensive output is possible using printing or the like, a value close to the average is output. In this way, it is possible to accommodate requests from the output side.

Next, a process of outputting a moving image will be explained. When the reproduction speed requested by the visual data output device 103 is the same as the temporal speed stored in the database section 102B, the only alteration performed is that of the resolution requested by the visual data output device 103. The cloud shown in FIGS. 4A and 4B is expressed at the resolution of the level of FIG. 3D. When the visual data output device 103 has requested resolution at the level of FIG. 3C, the image factor "100100: white data: 9000.000+2.500" of FIG. 4A, and the image factor "100101: white data: 9002.500+3.000" of FIG. 4B, stored in the database section 102B, are calculated in the same way as the still image at the level of FIG. 3C.

As a result, the image factor of FIG. 4A becomes "1001: one-quarter white data: 9000.000+2.500", and the image factor of FIG. 4B becomes "1001: one-quarter white data: 9002.500+3.000". Here, one-quarter expresses an average value of one-quarter, since there is only one D-level factor in the "1001" of the C-level. In fact, since other D-level image factors forming the cloud are present in the "1001", the average is greater than one-quarter, but this has been omitted in order to facilitate explanation. When the screens of FIGS. 3A and 3B have been converted to the level of FIG. 3C, they are both "1001: one-quarter white data", and only their time codes are represented by 9000.000+2.500 and 9002.500+3.000. Accordingly, the time codes are combined to give "1001: one-quarter white data: 9000.000+5.500", producing output data at the resolution of FIG. 3C.

As mentioned above, the visual data output device 103 need only be capable of outputting one-quarter white data. However, in conventional display devices, it is not possible to display the individual display elements in this way, and therefore, unless there is a special requirement to do so, less than one-quarter is treated as output of 0%, and more than one-quarter is treated as 100%, and such like. Therefore, since the above data has an average value of more than one-quarter, the output is "1001: white data: 9000.000+5.500".

Next, a process when the visual data output device 103 requests a fast-forward reproduction of a moving image will be explained. To facilitate understanding, a case in which a request is made to output the cloud of FIGS. 4A and 4B at ten times normal speed will be explained. Consequently, the data lasts for a duration of 0.25 seconds not from the 9000.000th second but from the 900.000th second after the start of the image of FIG. 4A, and the data of FIG. 4B lasts for a duration of 0.3 seconds from the 900.250th second. Such is the calculation, but in fact a person cannot accurately perceive the shape of an object in a period of 0.25 seconds or 0.3 seconds. Therefore, in view of this characteristic of human visual perception, the resolution should be made coarser. For example, dropping the resolution by one level as in the example mentioned above gives "1001: white data: 900.000.+0.55", thereby increasing the duration of the data by four times to 0.55 seconds, and making it perceptible to the human eye. The degree to which the resolution is made coarse is determined by the reproduction speed and the characteristics of human visual perception. This method accommodates the characteristics of human visual perception, eliminating wasteful transmission of data and reducing the burden on the transmission and display side.

Next, a process where the visual data output device 103 requests slow-motion reproduction will be explained. In this case, it is presumed that moving image data having a resolution sufficiently high for slow-motion reproduction is stored in the input side of the database. Increasing the number of fields in a scanning line is one method of filming a slow-motion image, but this raises the visual signal processing speed and requires expensive technology. On the other hand, technological advancements have led to the introduction of CCD cameras and the like with high resolution. By capturing the data from the input side using the division address method of this invention, it is possible to obtain fast-moving data at high resolution, which was impossible using a scanning line. The largest input data of the individual photoreceivers of the CCD and the like can be converted to separate quantities of digital data, obtaining visual data which is not restricted by the number of scanning lines or fields. These visual data are stored in a visual database, and are transmitted at a resolution and reproduction speed requested by the reproduction side. In contrast with fast-forward reproduction, by changing the time code to longer one, it is possible to obtain slow-motion reproduction. This method accommodates the characteristics of human visual perception, and enables the data to be transmitted at a resolution suitable for slow-motion reproduction speed.

Many other types of visual reproduction may be requested. For example, images may be reproduced backwards or paused to be viewed as a still picture, and the like, by using the visual data time codes. Furthermore, when zooming in or out from an image, in addition to changing the resolution to accommodate the characteristics of human visual perception, the level of the visual data is also changed, thereby effectively reducing the amount of transmitted data, as well as obtaining visual data which is kind to the human eye.

4. Creating Accounts and Copyright Fees

The visual database device 102 of the embodiment of the present invention described above is capable of creating visual data for output having various different levels of resolution from visual data stored in the database section 102B, and transmitting these data. That is, if the resolution is regarded as representing the quality, value, and information density of the data, it is possible to provide data of various different levels quality, value, and information density. In addition, the resolution can be used to numerically categorize the levels of quality, value, and information density, enabling them to be quantitatively managed.

Therefore, when use of the visual database system has been granted, accounts can be allocated to users who use the visual data output device 103 to view the visual data for output, in accordance with the level of the resolution of the visual data for output.

More specifically, all the visual data stored in the database section 102B are divided into multiple resolution levels, the fees (account fees) for each resolution level are set, and an account fee table is created and stored in the account/copyright fees controller 102D.

The output processor 102C creates the visual data for output and transmits it to the visual data output device 103, and inputs the resolution of the visual data for output to the account/copyright fees controller 102D. Based on this resolution, the account/copyright fees controller 102D refers to the account fees in the account fee table, creates and stores account information such as information representing reference numbers for the users, time of use, the visual data used, the resolution, and the account fees. The account information may also be transmitted to the users together with the visual data for output.

For example, when a user is using the display (the visual data output device 103) to watch a soccer match provided by a moving image transmitted from the visual database device 102 and wishes to view a particular scene as a still image, he can request high-resolution visual data for printing that portion as a still image. Then, the visual database device 102 can transmit the visual data (visual data for output) at the requested resolution, and charge a fee for the requested resolution to the user. Furthermore, a copyright fee for the requested resolution can be paid to the copyright holder of that visual data.

5. Advantages of the Visual Database System of the Present Embodiment

Advantages of the visual database system according to the present embodiment in the constitution described above will be explained taking a visual data output device as a specific example.

The visual data output device 103 described above can receive visual data at the required resolution from the visual database device 102. Therefore, when the visual data output device 103 comprises a large-scale display device, high-resolution visual data can be input thereto and displayed on a large-scale display screen.

Furthermore, when the visual data output device 103 comprises a miniaturized display device, a resolution matching that of the device can be requested, enabling the device to receive and display visual data at an appropriate resolution. Even when high-resolution visual data are stored in the visual database device 102, it is possible to transmit visual data at low resolution matching that of the miniaturized display device, thereby making it possible to reduce wasteful transmission of data, shorten the transmission time, and reduce the cost of the communication.

When the visual data output device 103 comprises a printing-device, the visual data can be extracted at the maximum resolution of the printing device, enabling the printing device to function at its best level.

Furthermore, since the visual data output device 103 is able to request visual data at a desired resolution, it can request a resolution suitable for the intended use of the visual data. For example, when the intention is to retrieve an image, low-resolution visual data are input and the image is retrieved at high-speed. When confirming the contents of the image, the visual data can be input at high-resolution and used to watch the image.

Alternatively, when enlarging part of the visual data prior to displaying and/or printing it, part of the visual data can be input at the resolution of the visual data output device 103, and displayed and/or printed. Since conventional visual database systems have only one type of resolution, the resolution generally deteriorates when the visual data are enlarged prior to displaying and printing. However, the visual database system of this invention can transmit enlarged visual data which can be displayed and printed at the maximum resolution of the visual data output device 103.

Furthermore, in this embodiment, visual data for output is created and transmitted at a resolution in accordance with the speed of the movement of the moving image, making it possible to transmit visual data at a resolution appropriate to its intended use. That is, it is possible to transmit only the information which relates to useful visual data.

Furthermore, the visual database system of this embodiment can handle resolutions having a wide bit width (the number of bits in the address data, e.g. 128 bits), including visual data which is so detailed that it cannot be distinguished by the human eye. For example, a picture can be stored in the visual database device 102 using visual data which is so detailed that it cannot be distinguished by the human eye. By using a large-scale display device, the visual data can be enlarged and displayed accurately so that they can be distinguished by the human eye.

As described above, the visual database system of this embodiment accounts and copyright fees can be changed in accordance with the resolution of the transmitted visual data for output, making it possible to set fees appropriately so as to satisfy users and copyright holders.

The above embodiment described cases where still images and moving images were used as the images of the visual data, but visual data often contains audio data. Audio data can be similarly accumulated at its maximum audio quality when input into the database section 102B, and when the requested audio quality is not particularly high, a number of bits of audio data which satisfies the required quality can be output. The quality of audio data does not vary as widely as the image quality of visual data, but it can for example be divided into FM broadcast level, CD level, DAT level, and such like. This audio data generally forms part of the visual data, and consequently lies within the range of this invention. It is also possible to edit the audio data in accordance with its intended use. For example, data from a multi-sound source can be reproduced in stereo or mono.

As described above in "2-2 Storing Visual Data", since it is possible to store only the required visual objects among the visual data in a memory medium such as the database section 102B and the like, visual data stored in a visual format in which the quantity of data changes in accordance with changes in the quantity of the images can be stored in a memory medium such that its memory position changes over time, and can be read out from the memory medium when required for reproduction. As a consequence, it is possible to provide a visual database system capable of storing and reproducing visual data efficiently.

When this method is used, the following specific advantages can be obtained. For example, when collecting and comparing visual data relating to jewels, the background of the jewels is not required. In this case, when visual data representing only the jewels themselves has been stored, the visual data for the jewels can be used efficiently when comparing them with other stones, placing one or multiple jewels in front of a background of any kind, and displaying them in a single image, and the like. This method can be applied not only to jewels but also to all types of visual objects, such as cars, plants, people, and animated images.

According to this method of capturing visual data, objects capable of moving can be provided with time codes which change, against a background of visual data with a time code which does not change. Stationary images can be reproduced by specifying background data and extracting the visual data therefrom, or by specifying the shape of the object to be reproduced and extracting it, or by first storing the visual data in a database, searching for data of similar types and extracting the object image, or by many other methods.

There are conventional methods whereby a person stands before a blue background, and the blue portion is replaced by a weather map to form the final display, and the like. However, according to the address method used in this invention, it is possible to create visual data representing the shape of the visual object, to extract that portion using one of a variety of methods, and to store only the visual data for that portion in the database. Visual data can be used to define not only objects in front, but also to the right, left, and rear. These data can be used to define and a three-dimensional image, and then stored. This is possible not only in a database for still images, but also in a database for moving images. For example, since an image of a moving car has not background, visual data can be created for a moving image in which the tires continue to rotate and the body of the car vibrates as time elapses. When applied to an image of a person running, this can be extremely useful in the study of movement or medical research.

As described above, the visual database system of this invention according to one aspect of this invention, the visual database device receives the visual data from the visual data input device, divides the input visual data into multiple block screens, appends a first address to each of the division block screens, further divides the block screens identified by the first addresses, appends a second address to each of the division block screens, and thereafter repeats the dividing and appending of addresses for a predetermined number of times. The visual data are expressed and stored as addresses and image data of a divided image represented by the addresses, and visual data for output are created in accordance with a resolution of the visual data output device, and transmitted. Therefore, it is possible to transmit visual data at a resolution appropriate to the resolution of the device which outputs the visual data. In addition, it is possible to transmit visual data at a resolution appropriate to its intended use. By creating visual data at resolutions which differ according to requirements from the same visual data, it is possible to provide a visual database system capable of transmitted visual data at a resolution which is always appropriate the resolution of the device which outputs the visual data.

Further, according to this invention, the visual database device receives the visual data from the visual data input device, divides the input visual data into multiple block screens, appends a first address to each of the division block screens, then further divides the block screens identified by the first addresses, appends a second address to each of the division block screens, and thereafter repeats the dividing and appending of addresses for a predetermined number of times. The visual data are expressed and stored using addresses and image data of a divided image represented by the addresses, and time codes representing a temporal position in changes over time. Visual data for output are created and transmitted in accordance with an output resolution of a still image and a moving image of the visual data output device. Therefore, it is possible to transmit visual data at a resolution appropriate to the resolution of the device which outputs the visual data. In addition, it is possible to transmit visual data at a resolution appropriate to its intended use. By creating visual data at resolutions which differ according to requirements from the same visual data, it is possible to provide a visual database system capable of transmitted visual data at a resolution which is always appropriate the resolution of the device which outputs the visual data.

Furthermore, according to the visual database system of this invention, before receiving visual data from the visual database device, the visual data output device notifies the visual database device of information specifying the visual data it wishes to receive, its own resolution or a desired resolution, and output time units for receiving a moving image in slow motion or fast forward or the like. Therefore, it is possible to transmit visual data at a resolution appropriate to the resolution of the device which outputs the visual data, and to efficiently transmit the visual data at a resolution appropriate to its intended use in the device which outputs the visual data.

Further, according to the visual database system of this invention, the addresses are defined with a divided state represented by division levels n, the division state is defined so as to obtain the 2nth power of 2 pieces of block division images by dividing the vertical and horizontal axes of the display screen by the nth power of 2, respectively, and the addresses are specified using the division levels n. Therefore, the visual data can be efficiently stored and read using the addresses, and the visual data can be handled more conveniently.

Further, according to the visual database system of this invention, the addresses are defined by appending first addresses of two bits "00", "01", "10", and "11" to four division blocks obtained by a division state represented by division level n=1, second addresses of two bits "00", "01", "10", and "11" are appended to blocks obtained by further dividing into four the one-quarter division blocks identified by the first addresses. This division is repeated while appending the first addresses followed by the second addresses. Therefore, the visual data can be efficiently stored and read using the addresses, and the visual data can be handled more conveniently.

Furthermore, according to the visual database system of this invention, when the visual data output to the visual data output device comprises a still image, the visual database device creates and transmits visual data for output at the maximum resolution of the visual data output device. When the visual data comprises a moving image, the visual database device creates and transmits visual data for output having a resolution altered in accordance with the speed of the movement of moving image. Therefore, it is possible to transmit visual data (visual data for output) at a resolution appropriate to the characteristics of the human eye, making it possible to reduce the amount of information when transmitting the visual data.

Furthermore, according to the visual database system of this invention, when creating visual data for output from stored visual data and transmits the visual data for output, the visual database device changes a database usage fee for the visual data in accordance with the resolution of the visual data for output. Therefore, it is possible to set fees appropriate to the manner in which the visual data is used.

Furthermore, according to this invention, the visual database device uses the addresses to express a visual object, and stores visual data only for this visual object. Therefore, since it is possible to store only the visual data for that object in the database, the usability of the visual data can be further improved.

Furthermore, according to this invention, time codes are appended to one or multiple visual data when stored in the memory medium. When the visual data is reproduced from the memory medium, the time codes are read while extracting the visual data from its memory position, and the reproduction speed of the memory medium is changed so that the visual data is reproduced in correspondence with changes over actual time. Therefore, visual data comprising a visual format in which the amount of data changes according to the amount of change of an image can be efficiently stored in a memory medium in which its memory position changes over time, and the visual data can be read out from the memory medium as required and reproduced.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A visual database system for storing visual data, comprising a visual format in which the amount of data changes according to the amount of change of an image, in a memory medium wherein a memory position changes over time, and reading the visual data from said memory medium as required, wherein time codes, representing at least a start time and a duration value, are appended to one or a plurality of visual data when stored in said memory medium; and when the visual data is reproduced from said memory medium, the time codes are read while extracting the visual data from its memory position, and the reproduction speed of said memory medium is changed so that the visual data is reproduced in correspondence with changes over actual time.

2. A visual database system for storing and transmitting visual data such as at least moving images and still images, said system comprising:

at least one visual data input device which inputs the visual data;

a visual database device which receives and stores the visual data input by said visual data input device and simultaneously appends time codes to said visual data, said time codes representing a start and duration timing values of said visual data; and at least one visual data output device which receives the visual data at a predetermined resolution from said visual database device, and displays and prints the visual data, wherein input image data for a moving image is provided and addresses are set for each image factor comprising a group of identical data forming a moving image on a screen.

3. The visual data base system of claim 2, wherein said visual data comprises image factors, in combination with addresses, display data representing colors and time codes appended thereto.

4. The visual data base system of claim 2, wherein the visual reproduction of said visual data is modified by changing the timing values of said time code.

5. The visual data base system of claim 4, wherein said system is adapted for fast-forward reproduction of a moving image and, for such reproduction, said start time and duration timing values are reduced.

6. The visual data base system of claim 4, wherein said system is adapted for slow motion reproduction of a moving image and, for such reproduction, said start time and duration timing values are lengthened.

* * * * *